(12) United States Patent
Ohara

(10) Patent No.: US 8,014,503 B2
(45) Date of Patent: Sep. 6, 2011

(54) NETWORK SYSTEM

(75) Inventor: Kiyotaka Ohara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1196 days.

(21) Appl. No.: 11/616,496

(22) Filed: Dec. 27, 2006

(65) Prior Publication Data

US 2007/0152806 A1 Jul. 5, 2007

(30) Foreign Application Priority Data

Dec. 27, 2005 (JP) ................................ 2005-374355

(51) Int. Cl.
*H04M 11/00* (2006.01)
(52) U.S. Cl. ...................... 379/102.01; 340/3.54
(58) Field of Classification Search .............. 340/3.7, 340/3.54, 825.69; 379/102.01, 100.15, 106.01, 379/88.12
See application file for complete search history.

(56) References Cited

U.S. PATENT DOCUMENTS

| | | | | |
|---|---|---|---|---|
| 7,409,451 | B1 * | 8/2008 | Meenan et al. | 379/100.15 |
| 7,538,686 | B2 * | 5/2009 | Yeh et al. | 379/102.01 |
| 7,639,157 | B1 * | 12/2009 | Whitley et al. | 340/870.02 |
| 7,650,145 | B2 * | 1/2010 | Ukita et al. | 379/102.01 |
| 2004/0016243 | A1 | 1/2004 | Song et al. | |
| 2005/0114458 | A1 * | 5/2005 | Gottlieb | 379/88.12 |
| 2005/0248444 | A1 * | 11/2005 | Joao | 455/41.2 |
| 2006/0044106 | A1 * | 3/2006 | Hirose et al. | 340/3.54 |
| 2006/0197676 | A1 * | 9/2006 | Smith | 340/10.1 |

FOREIGN PATENT DOCUMENTS

| | | |
|---|---|---|
| EP | 1278391 A1 | 1/2003 |
| JP | H06-178029 A | 6/1994 |
| JP | H06-178039 A | 6/1994 |
| JP | 2000155658 A | 6/2000 |
| JP | 2000181825 A | 6/2000 |
| JP | 2002319947 A | 10/2002 |
| WO | 9725808 | 7/1997 |
| WO | 9934339 | 7/1999 |
| WO | 2004082318 A1 | 9/2004 |

OTHER PUBLICATIONS

Chinese Office Action received on Apr. 25, 2008, in corresponding Chinese Application No. 2006-1000636328.
European Patent Office, European Search Report for EP Appl'n. No. 06026676 (counterpart to above-captioned patent appl'n) mailed May 11, 2007.
Japanese Office Action issued in corresponding Japanese Application No. 2005-374355, mail dated Jul. 8, 2008.
Tech-On! (and concise statement of relevance), JEITA, Jan. 29, 2002.

* cited by examiner

Primary Examiner — Curtis Kuntz
Assistant Examiner — Maria El-Zoobi
(74) Attorney, Agent, or Firm — Baker Botts L.L.P.

(57) ABSTRACT

In a network system, a notifying apparatus located in the network system is specified. If a predetermined event occurs when a function execution apparatus executes its function, the occurrence of this event can be notified to the specified notifying apparatus via a network.

8 Claims, 18 Drawing Sheets

FIG. 3

| ITEM | EXAMPLE OF VALUE |
|---|---|
| COMMAND | FINDALERTDEVICE |
| IP ADDRESS | 192.169.12.55 |

FIG. 4

| ITEM | EXAMPLE OF VALUE |
|---|---|
| COMMAND | FINDALERTDEVICERESP |
| IP ADDRESS | 192.169.12.34 |

FIG. 5

| ITEM | EXAMPLE OF VALUE |
|---|---|
| COMMAND | ALERTINFO |
| ALERT ID | MAC ADDRESS OF CALLING SOURCE APPARATUS AND ALERT STATE OCCURRENCE TIME: 00:80:77:12:34:56:093411 |
| IP ADDRESS | IP ADDRESS OF ALERT OCCURRENCE SOURCE (*) 192.169.12.55 |
| ALERT TASK | TASK ID |
| URGENT LEVEL | HIGH LEVEL / LOW LEVEL |
| EXECUTION TIME RANGE | AM8:00 – PM5:00 |
| RINGING COUNTER | INITIAL VALUE 0 |
| RINGING INTERVAL | 1 HOUR |
| RE-RINGING TIME | NO INITIAL VALUE |

(*) WHEN ALERTVOICE ISSUING SOURCE IS MULTIFUNCTION APPARATUS, IP ADDRESS IS DEFINED AS OWN IP ADDRESS

FIG. 6

| ITEM | EXAMPLE OF VALUE |
|---|---|
| COMMAND | ALERTCANCEL |
| ALERT ID | ALERT ID DESCRIBED IN SUBJECT ALERT INFORMATION 00:80:77:12:34:56:093411 |

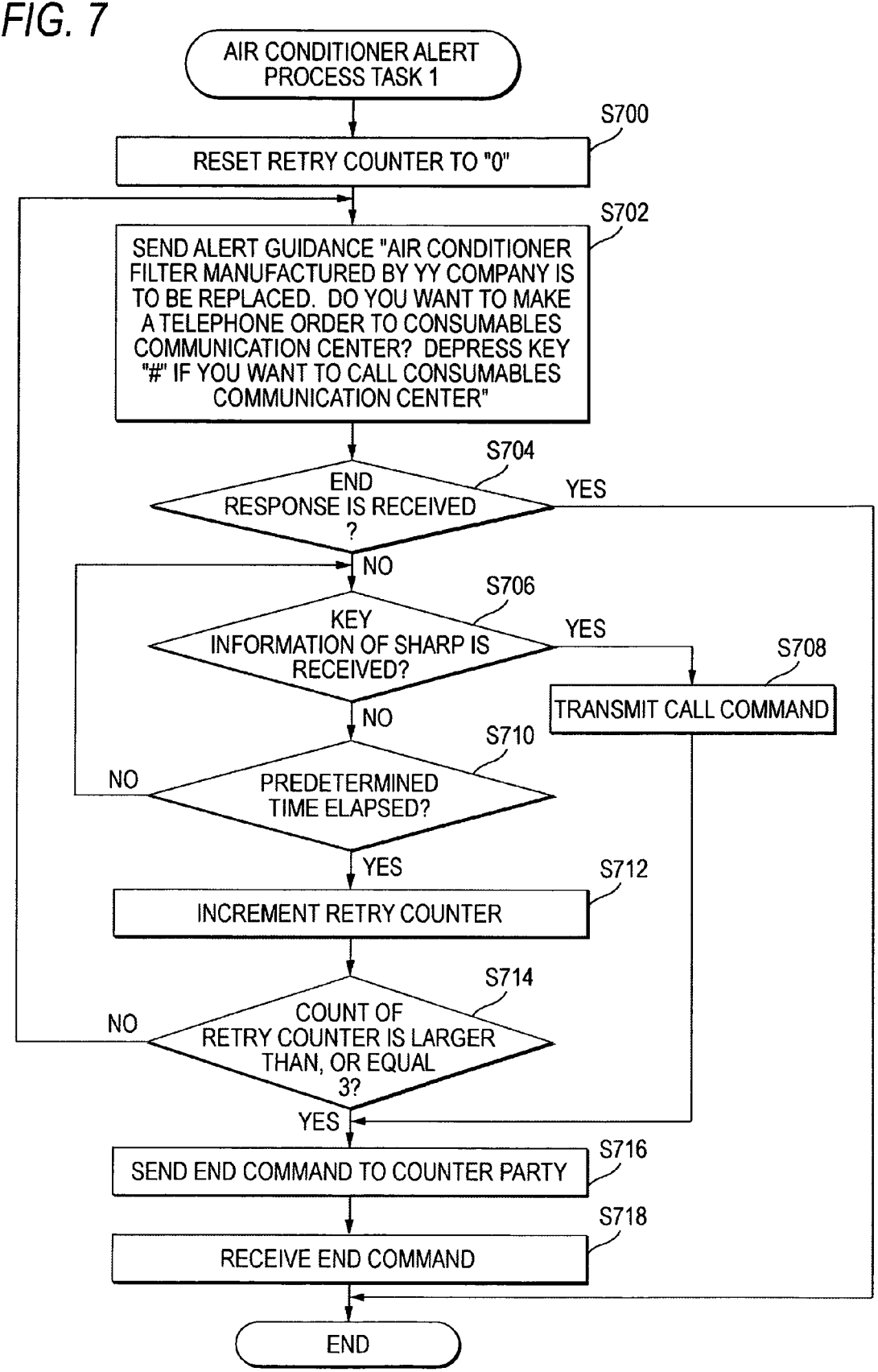

FIG. 8

| ITEM | EXAMPLE OF VALUE |
|---|---|
| COMMAND | ALERTGUIDANCE |
| GUIDANCE CHARACTER STRING | TIME TO REPLACE ... |

FIG. 9

| ITEM | EXAMPLE OF VALUE |
|---|---|
| COMMAND | KEYINFO |
| KEY INFORMATION | #, *, 1, 2, ... |

FIG. 10

| ITEM | EXAMPLE OF VALUE |
|---|---|
| COMMAND | ENDRESP |

FIG. 11

| ITEM | EXAMPLE OF VALUE |
|---|---|
| COMMAND | CALL |
| TELEPHONE NUMBER | 0120-123-4567 |

FIG. 12

| ITEM | EXAMPLE OF VALUE |
|---|---|
| COMMAND | END |

FIG. 14

| ITEM | EXAMPLE OF VALUE |
|---|---|
| COMMAND | USERVOICE |
| CHARACTER STRING | 28 DEGREES |

(FIG.15 CONTINUED)
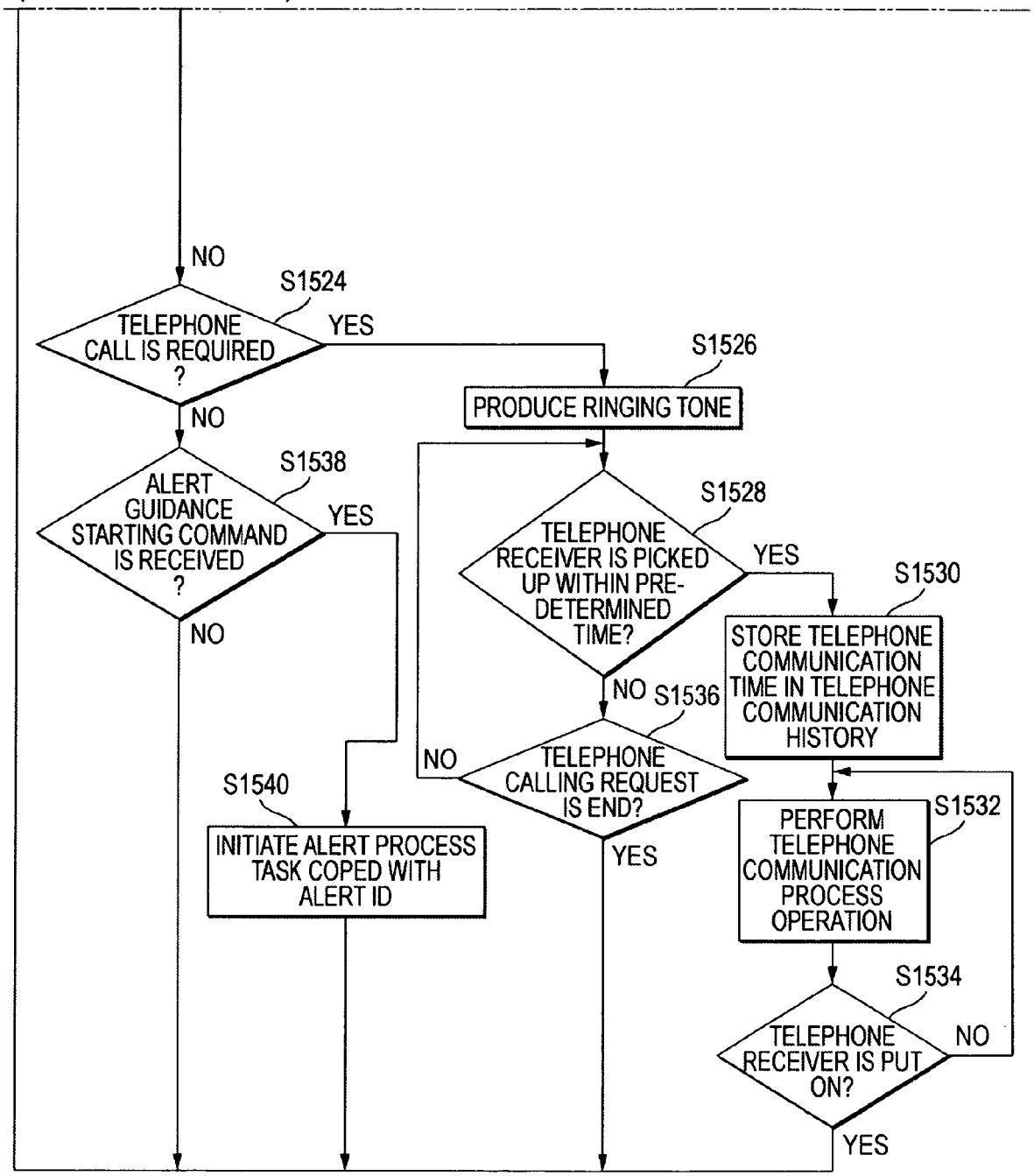

| ITEM | EXAMPLE OF VALUE |
|---|---|
| COMMAND | ALERTDEVICE |
| IP ADDRESS | 192.169.12.34 |

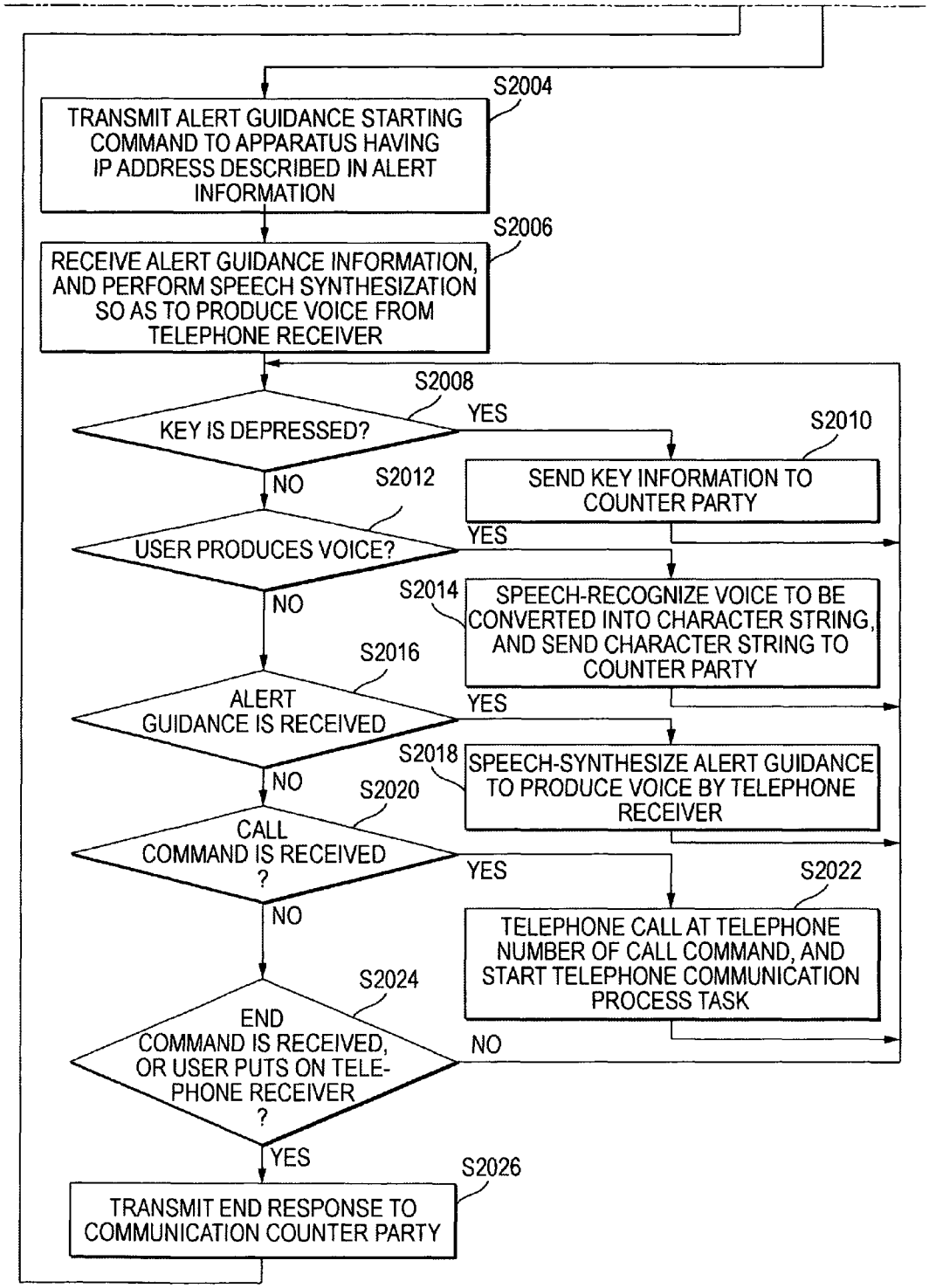

*FIG. 21*

| ITEM | EXAMPLE OF VALUE |
|---|---|
| COMMAND | STARTALERTGUIDANCE |
| ALERT ID | ALERT ID DESCRIBED IN SUBJECT ALERT INFORMATION<br>00:80:77:12:34:56:093411 |

NETWORK SYSTEM

CROSS-REFERENCE TO RELATED APPLICATION

This application claims priority from Japanese Patent Application No. 2005-374355, filed on Dec. 27, 2005, the entire subject matter of which is incorporated herein by reference.

TECHNICAL FIELD

Aspects of the present invention relate to a network system in which a plurality of apparatuses are connected via a network to each other.

BACKGROUND

Recently, network systems have been proposed in which, for example, household electric appliances are connected via a local area network (LAN) to each other (refer to, for instance, JP-A-2002-319947).

Also, other network systems have been proposed: air conditioners, electric lamps, and the like are controlled by a compact remote controller; washing machines are proposed, the optimum washing course of which can be downloaded through the Internet; and refrigerators in which if a stock of beers is decreased, then beer orders are automatically issued (refer to, for example, "JEITA releases model house where 50 sorts of network household electric appliances are installed" by C.HORIKIRI, [online], Tech-On!, [retrieved on Oct. 25, 2005], Internet <URL:http://techon.nikkeibp.co.jp/members/01db/200201/1006 405/>)

SUMMARY

Aspects of the invention provide a network system in which even when a user of a function execution apparatus is not present at an installation place thereof, the user can firmly recognize an event occurred in the function execution apparatus.

BRIEF DESCRIPTION OF THE DRAWINGS

FIG. 3 is a diagram for indicating a content of a search packet according to the aspect of the present invention;

FIG. 4 is a diagram for showing a content of a search response packet according to the aspect of the present invention;

FIG. 5 is a diagram for indicating a content of alert information according to the aspect of the present invention;

FIG. 6 is a diagram for showing a content of an alert cancel comment according to the aspect of the present invention;

FIG. 7 is a flow chart for explaining an air conditioner alert process task 1 according to the aspect of the present invention;

FIG. 8 is a diagram for indicating a content of an alert guidance according to the aspect of the present invention;

FIG. 9 is a diagram for showing a content of key information according to the aspect of the present invention;

FIG. 10 is a diagram for indicating a content of an end response according to the aspect of the present invention;

FIG. 11 is a diagram for showing a content of a call command according to the aspect of the present invention;

FIG. 12 is a diagram for indicating a content of an end command according to the aspect of the present invention;

FIG. 14 is a diagram for indicating a content of user voice information according to the aspect of the present invention;

FIG. 21 is a diagram for indicating a content of an alert guidance starting command according to the aspect of the present invention;

DETAILED DESCRIPTION

[General Overview]

Figure 1:
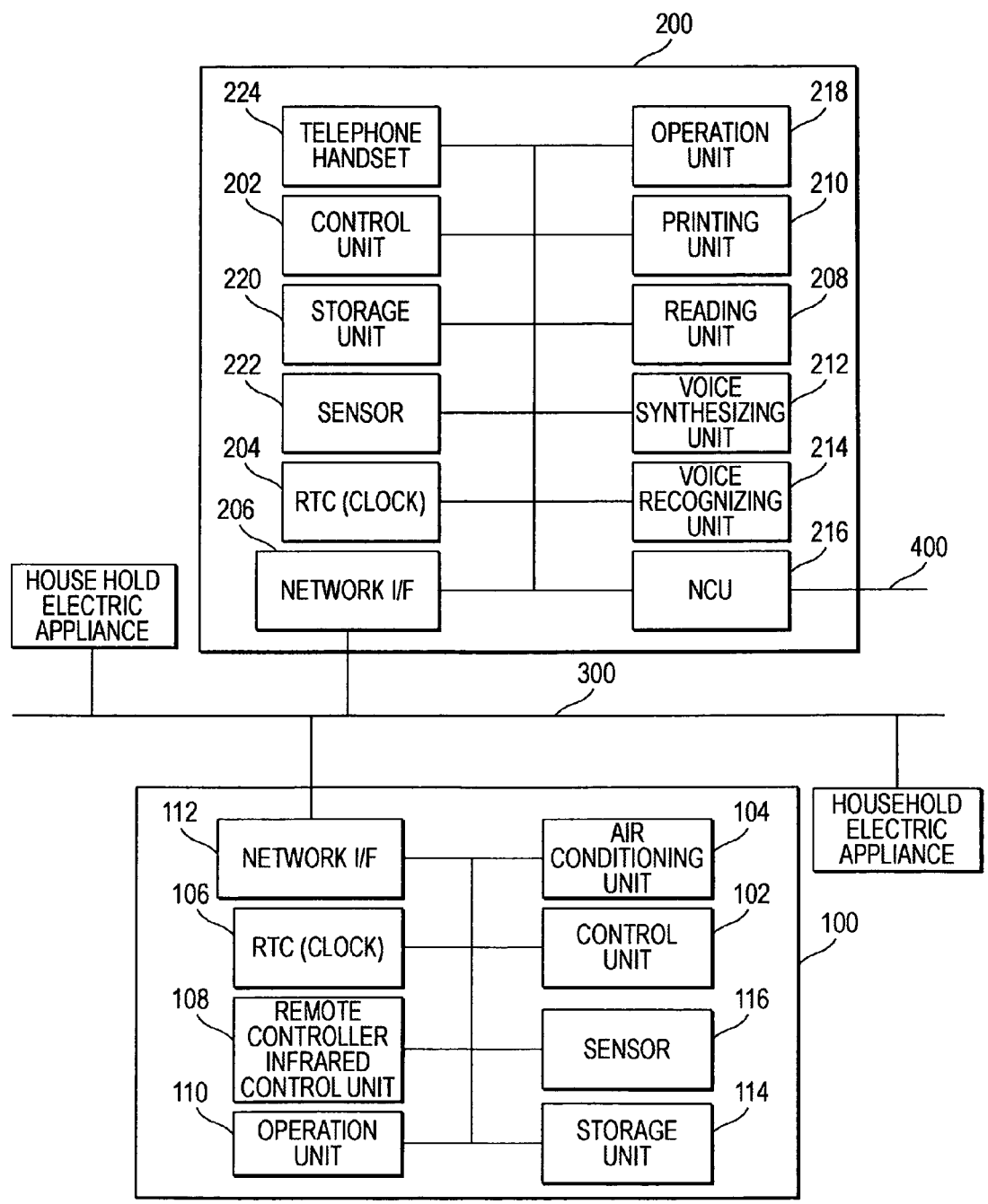
FIG. 1 is a diagram for showing a network system according to an aspect of the present invention.

A network system according to one aspect of the present invention is configured such that a notifying apparatus located in the network system is specified. If a predetermined event occurs when a function execution apparatus executes its function, the occurrence of this event can be notified to the specified notifying apparatus via a network.

According to the network system, even when a user of a function execution apparatus does not be present at an installation place of the function execution apparatus, the user can firmly recognize an event occurred in the function execution apparatus.

According to another aspect of the invention, a network system can be provided in which even when the network system is changed, more specifically, even when an apparatus connected to the network is additionally provided or is deleted, the user can firmly recognize an event occurred in the function execution apparatus.

According to still another aspect of the invention, a network system can be provided in which when the function executable condition by the function execution apparatus is established, the user can firmly recognize an event occurred in the function execution apparatus.

According to still another aspect of the invention, the above-described advantageous effects can be achieved without employment of a dedicated notifying apparatus.

According to still another aspect of the invention, there is provided a network system comprising: a function execution apparatus that executes a predetermined function; and a notifying apparatus connected via a network to the function execution apparatus, wherein the function execution apparatus comprises: a notifiable information communication unit that receives notifiable information transmitted from the notifying apparatus, the notifiable information indicating that the notifying apparatus is under notifiable state; an event detecting unit that detects an event occurred in the function execution apparatus; and a specific information transmitting unit that transmits, if the event is detected by the detecting unit, specific information capable of specifying the occurrence of the event to the notifying apparatus that transmits the notifiable information, and wherein the notifying apparatus comprises: a notifying apparatus-sided transmitting unit that transmits notifiable information to the function execution apparatus; a notifying apparatus-sided receiving unit that receives specific information transmitted from the function execution apparatus; a notifying unit capable of notifying the occurrence of the event in the function execution apparatus; and a notification control unit that causes the notifying unit, if the notifying apparatus-sided receiving unit receives the specification information, to notify the occurrence of the event specified by the specific information.

When a predetermined event occurs in the function execution apparatus, the function execution apparatus can notify the occurrence of this event with respect to the notifying apparatus present on the network (namely, when predetermined even occurs in function execution apparatus present on network, notifying apparatus can notify occurrence of this event).

It should also be noted that the notification as to the occurrence of the event by the notifying apparatus is not limited only to a direct notifying system, but may be realized by an indirect notifying system capable of notifying a measure for this event.

According to still another aspect of the invention, the notifiable information communication unit transmits notification permit/not-permit information for determining as to whether or not the notifying apparatus is under notifiable state to the notifying apparatus, and the notifying apparatus-sided transmitting unit transmits, upon at least one of a reception of the notification permit/not-permit information and an elapse of a predetermined time, the notifiable information to the function execution apparatus.

Thus, the function execution apparatus can firmly specify the notifying apparatus which is present on the network and is capable of notifying an event occurred therein.

According to still another aspect of the invention, the function execution apparatus further comprises a state transition detecting unit that detects a transition to such a state that the execution apparatus is able to execute its function, and the notifiable information communication unit transmits, if the transition to such the state that the function execution apparatus is able to execute its function is detected, the notification permit/not-permit information to the notifying apparatus.

Thus, under such a condition that a predetermined event may occur, the function execution apparatus can specify such a notifying apparatus capable of notifying the occurrence of this event.

According to still another aspect of the invention, the notifying apparatus is a telephone apparatus.

As a consequence, presence of information which should be notified can be notified to the user of the function execution apparatus by ringing the calling tone, and also, the execution permission/not permission of the process operation which should be performed in association with this information to be notified can be confirmed by outputting voice.

[Illustrative Aspects]

Referring now to drawings, illustrative aspects of the present invention will be described. It should be noted that the present invention is not limited only to the below-mentioned structures, but may employ various sorts of structures made based upon the technical scope and spirit of the present invention.

Firstly, a description is made of an arrangement of a network system according to an aspect of the present invention.

As indicated in FIG. 1, a network system 1 owns such an arrangement that an air conditioner 100 is connected to a multifunction apparatus 200 by way of a LAN (Local Area Network) 300. The multifunction apparatus 200 is connected to a telephone line 400 and may also function as a facsimile apparatus, or the like.

It should be understood that since this network system 1 indicates such a network system established in a general home environment, the air conditioner 100 is exemplified in the drawing as a typical household electric appliance. Alternatively, at least one electric appliance selected from other household electric appliances such as a refrigerator, a television, an electric lamp, a washing machine, and a picture storage apparatus maybe connected to a network so as to construct the network system 1.

Also, the network system 1 may be alternatively arranged as such a network system established in an office of an enterprise, or a factory. In this alternative network system, various sorts of business appliances, or various sorts of manufacturing facilities are connected to each other via a LAN.

The air conditioner 100 is constituted by a CPU (Central Processing Unit), a ROM (Read-Only memory), a RAM (Random access Memory), which are not shown in this drawing. The air conditioner 100 is equipped with a control unit 102, an air conditioning unit 104, an internal clock (will be referred to as "RTC" hereinafter) 106, a remote-controller infrared control unit 108, an operation unit 110, a network interface (will be referred to as "network I/F" hereinafter) 112, a storage unit 114, and a sensor 116. The control unit 102 controls an entire operation of the air conditioner 100. The air conditioning unit 104 realizes either a cooling function or a heating function. The remote-controller infrared control unit 108 receives a signal produced by a remote control operation, and controls this received signal. The operation unit 110 is provided on a main body (for example, indoor unit) of the air conditioner 100 and forcibly initiates or stops the air conditioning unit 104. The network I/F 112 is directly connected to the LAN 300. The storage unit 114 stores thereinto various sorts of data. The sensor 116 senses various sorts of states (as states to be sensed, for instance, room temperature, adhesion of dust on air filter).

The multifunction apparatus 200 includes a CPU, a ROM, a RAM, which are not shown in this drawing. The multifunction apparatus 200 is equipped with a control unit 202, an RTC 204, a network I/F 206, a reading unit 208, a printing unit 210, a voice synthesizing unit 212, a voice recognizing unit 214, a communication control unit (will be referred to as "NCU" hereinafter) 216, an operation unit 218, a storage unit 220, and a sensor 222. The control unit 202 controls an entire operation of the multifunction apparatus 200. The network I/F 206 is directly connected to the LAN 300. The reading unit 208 reads information described on a recording medium such as a paper sheet. The printing unit 210 prints image data which is entered via either a telephone line 400 or the reading unit 208. The voice synthesizing unit 212 converts character string data into voice. The voice recognizing unit 214 recognizes voice data. While the NCU 216 is connected via the telephone line 400 to an exchange (not shown), this NCU 216 receives a calling signal issued from the exchange, and controls connection/disconnection of a line upon receipt of the calling signal. The operation unit 218 is employed so as to input predetermined characters and numerals. The storage unit 220 stores therein various sorts of data. The sensor 222 senses various sorts of errors (for example, paper jam, ink depletion, and toner depletion) which occur in the multifunction apparatus 200.

Also, the multifunction apparatus 200 is equipped with a telephone handset (microphone and speaker) 224 functioning as an input/output unit of voice data.

It should also be understood that in either the control unit 102 or the control unit 202, the CPU controls either the air conditioner 100 or the multifunction apparatus 200 itself in accordance with a control program (namely, program for executing respective process operations containing below-mentioned process operation) stored in the ROM.

In the network system 1, data which is transmitted from the air conditioner 100 to the multifunction apparatus 200 is formed as character string data. The multifunction apparatus 200 is equipped with the voice synthesizing unit 212 for notifying information related to the air conditioner 100. Alternatively, the air conditioner 100 may be provided with the voice synthesizing unit 212, and voice data may be transmitted from the air conditioner 100 to the multifunction apparatus 200.

As another method, the following arrangement may be alternatively employed. That is, the multifunction apparatus 200 may store thereinto information which is notified in association with identification information. The air conditioner 100 may transmit this identification information to the multifunction apparatus 200 in response to an event occurred in the air conditioner 100. Upon receipt of this identification information, the multifunction apparatus 200 may alternatively notify information corresponding to this received identification information. In this alternative case, an amount of data flowing through the LAN 300 may be reduced.

Next, process operations executed by the network system 1 with employment of the above-described arrangement will now be described with reference to drawings.

(Main Process Operation of Air Conditioner)

Figure 2:
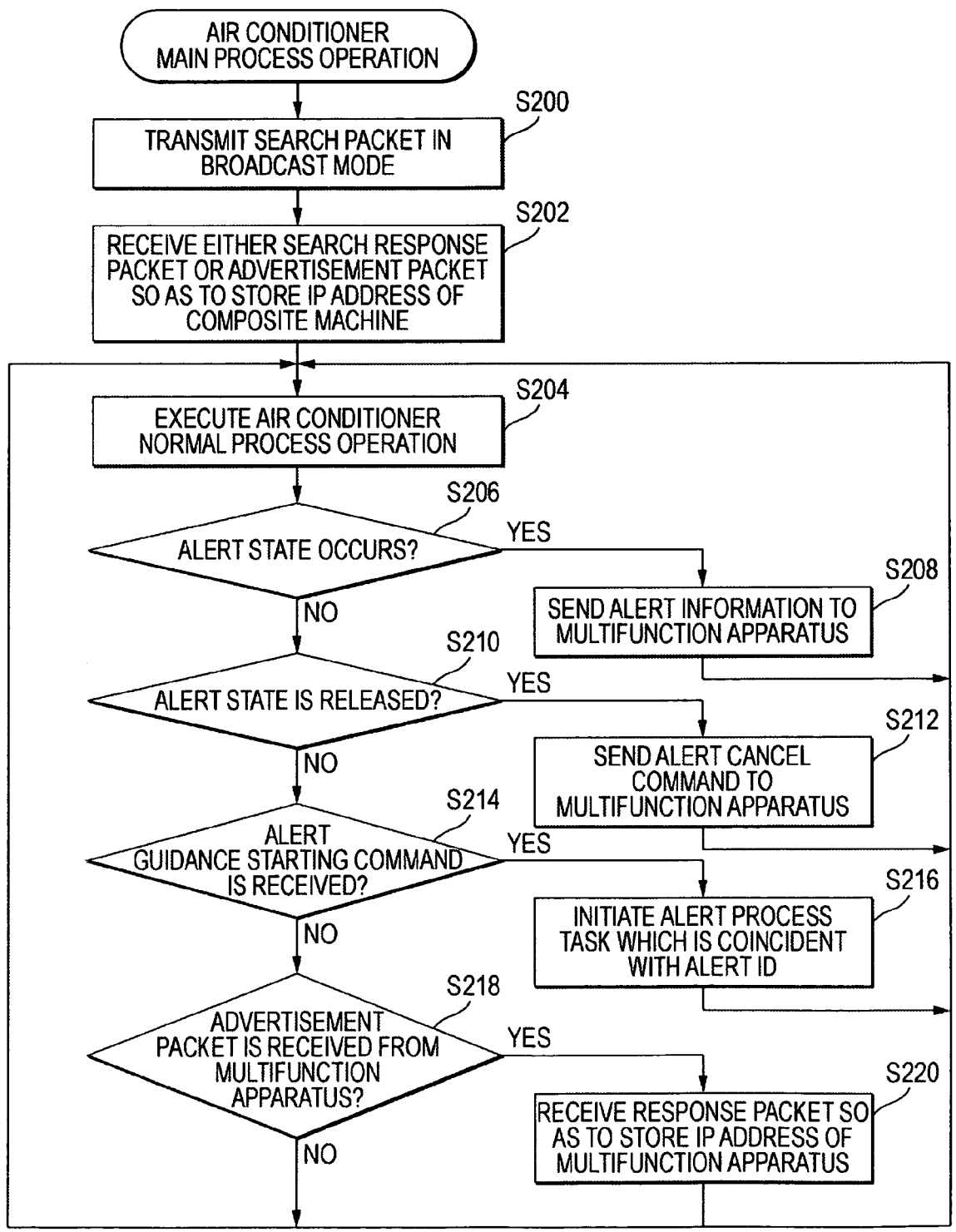
FIG. 2 is a flow chart for explaining an air conditioner main process operation according to the aspect of the present invention.

FIG. 2 illustrates a flow chart of a main process operation which is executed by the air conditioner 100.

First, when a user switches ON a main power supply of the air conditioner 100, the control unit 102 of the air conditioner 100 broadcasts a search packet in order to check the presence of an apparatus which is present in the network system 1 and is capable of notifying a predetermined event when occurring in the air conditioner 100 itself. The above-described apparatus corresponds to the multifunction apparatus 200 in this aspect (step S200. In the S200, the search packet to be sent (command name: FINDALERTDEVICE) has items shown in FIG. 3 as the contents. An item "IP address" shows an IP address allocated to the air conditioner 100.

After executing the process step S200, the control unit 102 waits until a search response packet is sent from the multifunction apparatus 200 in response to the transmission of the search packet in the S200. Upon reception of the search response packet, the control unit 102 stores an IP address allocated to the multifunction apparatus 200, namely a transmission source indicated by the received search response packet in the storage unit 114 in the air conditioner 100 as a notifiable multifunction apparatus 200. The search response packet (command name: FINDALERTDEVICERESP) includes items shown in FIG. 4. An IP address described in the search response packet is an IP address added to the apparatus that sends the search response packet (namely, IP address of multifunction apparatus 200 in the present aspect).

Thereafter, the control unit 102 executes a process operation according to a control program stored in a predetermined ROM so as to execute a normal process operation according to an operation or the like for changing the setting temperature or so after activation (stating of operation) of the air conditioner 100. That is, an execution of a cooling function, or a heating function by the air conditioning unit 104, is instructed by a remote control operation by the user or a remote operation by the multifunction apparatus 200 or during the operation of the air conditioner 100 (S204).

Figures 16, 17:
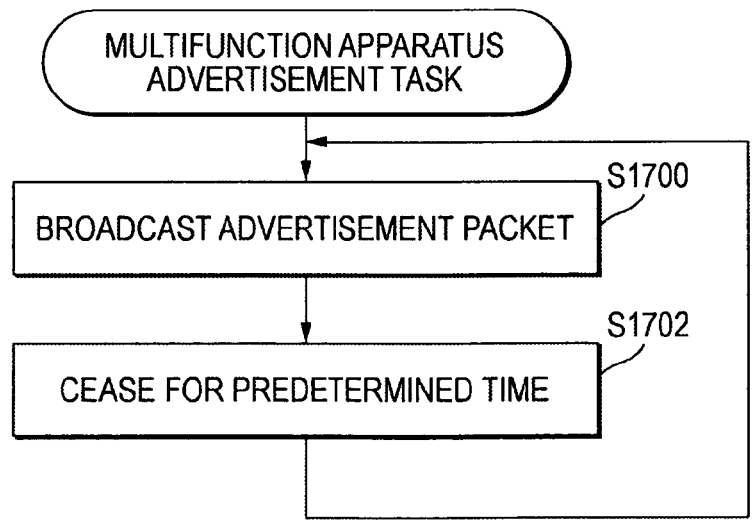
FIG. 16 is a diagram for indicating a content of an advertisement packet according to the aspect of the present invention.
FIG. 17 is a flow chart for explaining a multifunction apparatus advertisement task according to the aspect of the present invention.
Figure 18:
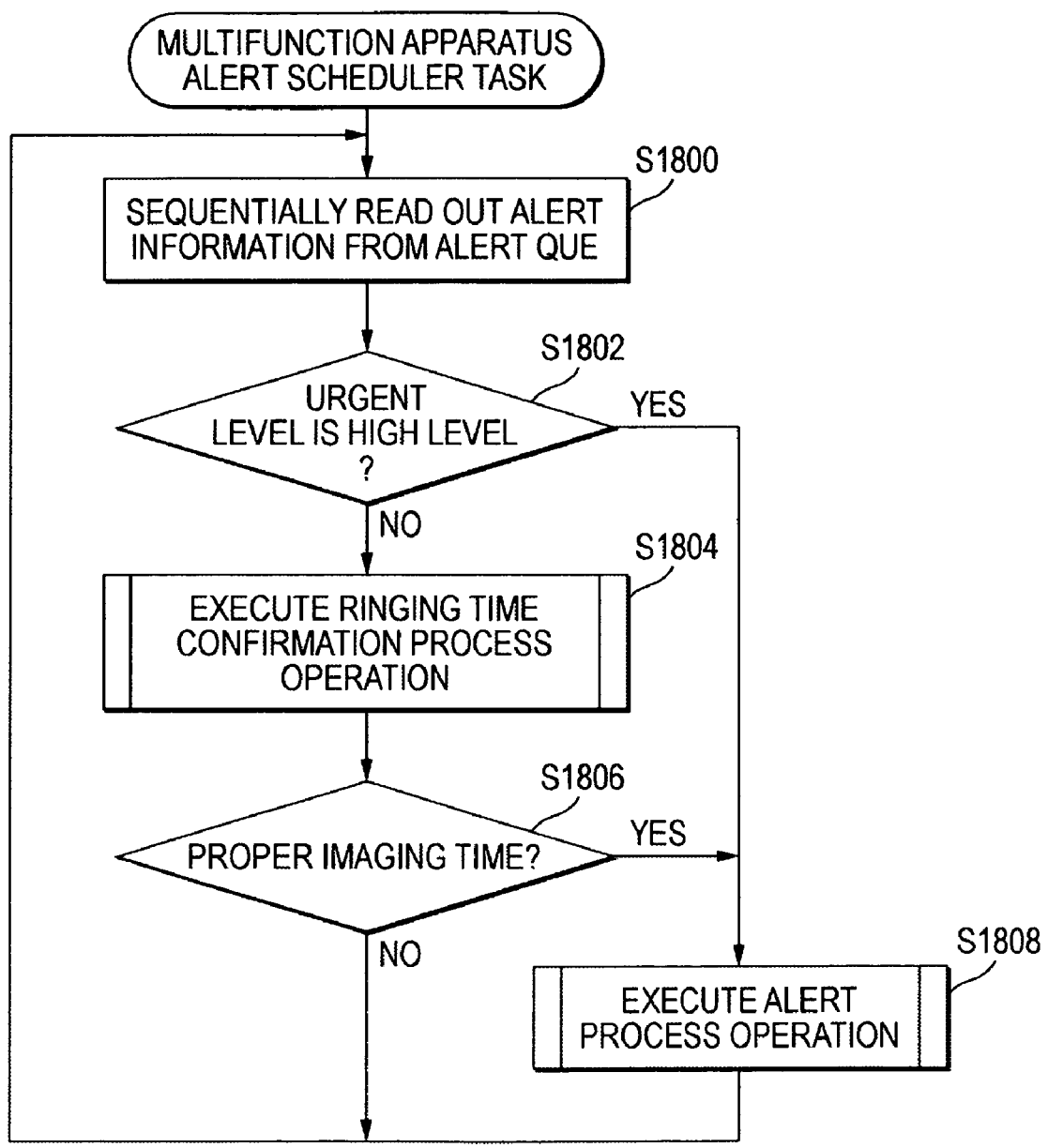
FIG. 18 is a flow chart for explaining a multifunction apparatus alert scheduler task according to the aspect of the present invention.
Figure 20:
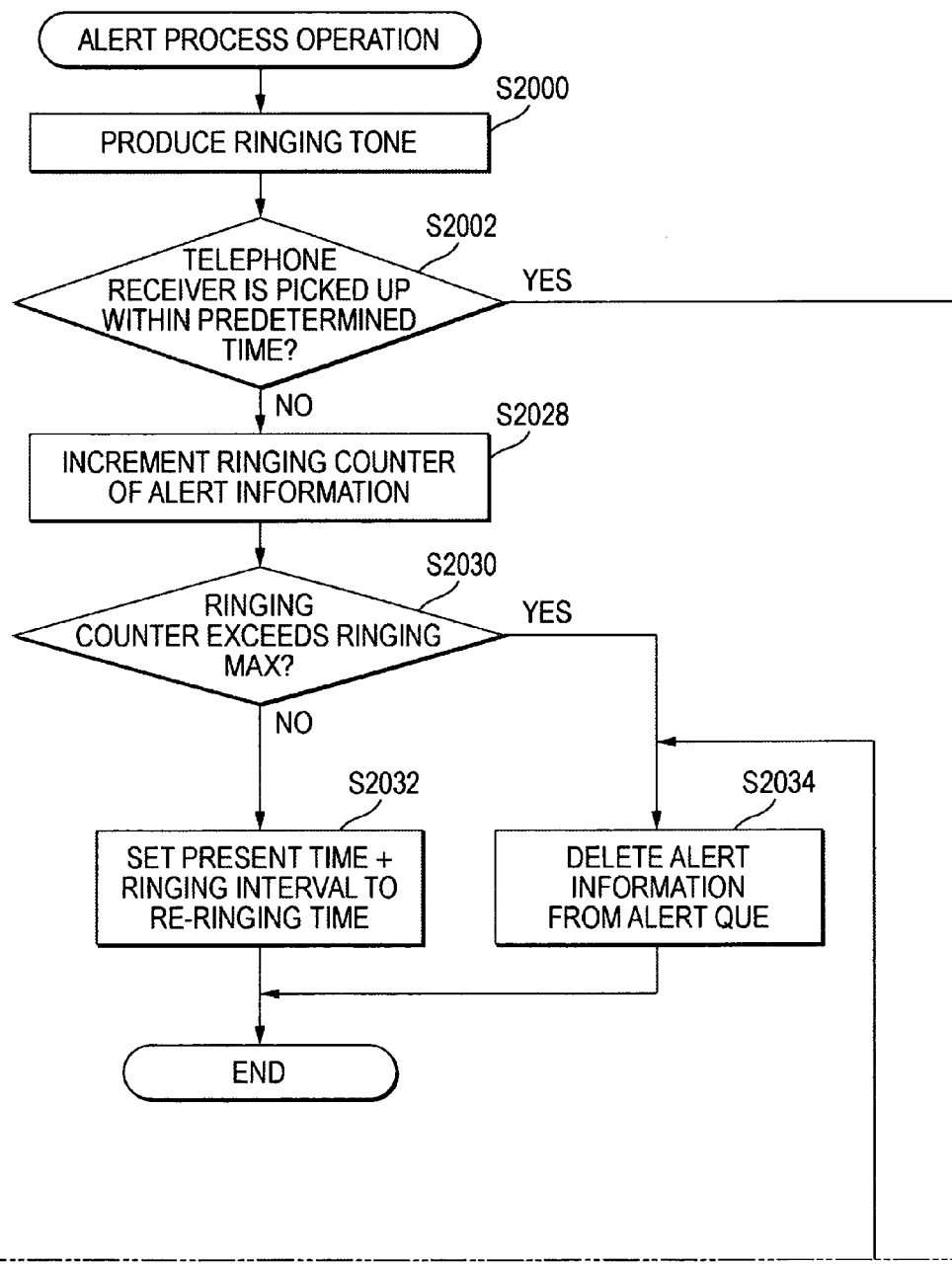
FIG. 20 is a flow chart for explaining an alert process operation according to the aspect of the present invention.

The control unit 102 continuously checks the following items during the normal process operation of the air conditioner 100, namely checks as to whether or not a predetermined event (alert status) is detected by the sensor 116, while the step S204 is executed. More specifically, the control unit 102 checks if it is necessary to ask the user to cope with the event having occurred in the air conditioner 100 (S206); if the alert status detected in the S206 is released (S210); if an alert guidance start command (see S2004 in FIG. 20) to be sent in an alert process operation by the multifunction apparatus 200, which will be described later, is received (S214); or if an advertisement packet (see S1700 in FIG. 17) to be sent by an advertisement task of the multifunction apparatus 200, which will be described later, is received (S218).

When the control unit 102 detects the occurrence of an alert condition (S206: YES), the control unit 102 produces alert information including items shown in FIG. 5, sends the alert information to the multifunction apparatus 200, and stores the alert information sent to the multifunction apparatus 200 into the air conditioner 100 (S208). Hereinafter, the means which performs this storage operation will be called "alert information storage unit." It should be noted that the alert information storage unit is secured in a predetermined area in the storage unit 114.

The alert information includes the items shown in FIG. 5. Here, an "alert ID" corresponds to a unique ID (identification information) generated by the combination of a unique address (MAC address) given to the air conditioner 100 and the time of occurrence of the alert state (S206: YES) measured by the RTC 106 (time being expressed as sequence of numerals; for example, "093411" for 9:34:11). The alert ID is used for identifying the alert information. The details of other items constituting the alert information will be given in the associated sections of the individual process operations to be illustrated below.

Although all the items shown in FIG. 5 are stored as alert information to be stored in the alert information storage unit in this aspect, it is substantially sufficient to store the "alert ID" and the "alert task".

On the other hand, when the control unit 102 detects release of the alert state (S210: YES), not the occurrence of the alert state (S206: NO), the control unit 102 sends an alert cancel command to the multifunction apparatus 200 to trigger a deletion of the alert information, which is executed in the main process operation of the multifunction apparatus 200 to be described later, from an alert queue (see S1518 in FIG. 15). At this time, the alert information, which is stored in the S208 and is to be effected by the present alert cancel command, is deleted from the storage unit.

It should also be noted that the alert cancel command (command name: ALERTCANCEL) has items shown in FIG. 6 as its contents. The alert ID to be transmitted is the alert ID described in the alert information which indicates release of the alert state.

When the control unit 102 detects reception of the alert guidance start command sent from the multifunction apparatus 200 (S214: YES; see FIG. 21 for alert guidance start command), alert information having an alert ID that matches with the alert ID designated by the alert guidance start command is extracted from the alert information storage unit. Then, the control unit 102 initiates a process operation corresponding to a task ID described as an alert task in the extracted alert information (S216).

The task ID indicates a process task which is executed for the alert state detected in the S206, and an "air conditioner alert process task 1", "air conditioner alert process task 2" and "multifunction apparatus alert process task" which will be discussed later are defined as task IDs in this aspect. Of course, other alert process tasks may be defined as well.

Furthermore, when the control unit 102 detects reception of an advertisement packet sent from the multifunction apparatus 200 (S218: YES) as mentioned above, not reception of the alert guidance start command (S214: NO), the control unit 102 performs the same process operation as done in the S202 (S220).

The transmissions in the S208 and S212 are effected to the multifunction apparatus 200 whose IP address is stored in the S202 and the S220.

After execution of the S208, S212, S216 and S220, the control unit 102 repeats the process operations of the S206 to S220 while continuously executing the S204.

(Air Condition Alert Process Task 1)

The air conditioner alert process task 1 relates to an alert process task which is executed when an alert state associated with replacement of a filter of the air conditioner 100 occurs (S206: YES). FIG. 7 illustrates a flow chart of the air conditioner alert process task 1.

First, when the air conditioner alert process task 1 is executed in the S216 of the air-conditioning main process operation, the control unit 102 resets a retry counter secured in a predetermined storage area in the RAM to "0" (S700).

Then, the control unit 102 sends an alert guidance associated with the air conditioner alert process task 1 to the multifunction apparatus 200 whose IP address is stored in the S202 and the S220.

The alert guidance (command name: ALERTGUIDANCE) includes items as shown in FIG. 8. In the alert guidance associated with the air conditioner alert process task 1 concerning filter replacement, character string data, such as "Time to replace an air conditioner filter of YY company. Connect to Consumables Communication Center? To make the connection, press #." is defined as a guidance character string.

Next, the control unit 102 determines as to whether or not an end response for the process task (command name: ENDRESP) is received from the user who has found out the activation of the air conditioner alert process task 1 by the notification by the multifunction apparatus 200 through the transmission in S702 (S704). When the determination result shows that the end response is received (S704: YES), the control unit 102 accomplishes the process operation without executing the subsequent process operations. The end response is sent from the multifunction apparatus 200 once the user picks up the telephone handset 224 but then returns it (see "S2024 and S2026 in alert process operation (FIG. 20)" by the multifunction apparatus 200 which will be described later).

When the end response is not received (S704: NO), on the other hand, the control unit 102 subsequently determines as to whether or not the input of the key "#" is received as key information (command name: KEYINFO) from the multifunction apparatus 200 (S706). That is, the control unit 102 determines as to whether or not the user has depressed the key "#" constituting the operation unit 218 of the multifunction apparatus 200 in response to the alert guidance "To make the connection, press #" in the alert guidance in the S702.

It should be noted that the "key information" and the "end response" are respectively defined as shown in FIGS. 9 and 10.

When having determined that the input of the key "#" has been received (S706: YES), the control unit 102 determines that the user wishes to purchase the air conditioner filter of the YY company at the Consumables Communication Center when it becomes the time to replace the air conditioner filter. Based on the intention of the user, the control unit 102 sends a call command to the multifunction apparatus 200 so as to order the filter at the Consumables Communication Center (S708), and then proceeds to a step process S716.

As explained above, according to the network system 1 of this aspect, the user can directly place an order for the filter at the Consumables Communication Center via the multifunction apparatus 200 and can purchase the filter (see "S2022 in alert process operation (FIG. 20)" and "S2302 in telephone communication task (FIG. 23)" by the multifunction apparatus 200 which will be described later). Thus, unlike in the related art, the filter as a consumable can be acquired without going out. The provision of the comfort by the network system 1 is limited to automatic calling to the Consumables Communication Center, after which an order for the filter is issued based on the user's intention. Therefore, the system can be made safer to be able to prevent an order from being placed without the user's knowing it.

A telephone number (0120-123-4567) of the Communication Center is defined in the call command (command name: CALL) as shown in FIG. 11.

To the contrary, when the control unit 102 has not received the input of the key "#" yet (S706: NO), the control unit 102 waits for a given time until the input of the key "#" made by the user (S710: NO).

When the control unit 102 cannot receive the input of the key "#" even after an elapse of the given time (S710: YES), the control unit 102 increments the retry counter reset in the S700 by one (S712), and then determines as to whether or not the value of the retry counter is equal to or greater than "3" as a consequence of the incrementation (S714).

That is, the control unit 102 determines that with regard to notification by the multifunction apparatus 200 based on the transmitted alert guidance (see "S2026 in alert process operation (FIG. 20)" by multifunction apparatus 200 to be described later), the user could not hear or understand the alert guidance uttered via the telephone handset 224 in the S702 executed previously. Thus, the control unit 102 performs control again to effect the same notification.

In other words, when the value of the retry counter is equal to or smaller than "2", the control unit 102 determines "NO" in the S714, and executes the process operations following the step process S702 again. When the value of the retry counter is equal to or greater than "3", on the other hand, the control unit 102 sends an end command to the multifunction apparatus 200 (S716), and accomplishes the air conditioner alert process task 1 when receiving an end response (see "S2026 in alert process operation (FIG. 20)" by multifunction apparatus 200 to be described later) sent from the multifunction apparatus 200 which has received the end command (S718).

The end command in the S716 (command name: END) is defined as shown in FIG. 12.

(Air Conditioner Alert Process Task 2)

Figure 13:
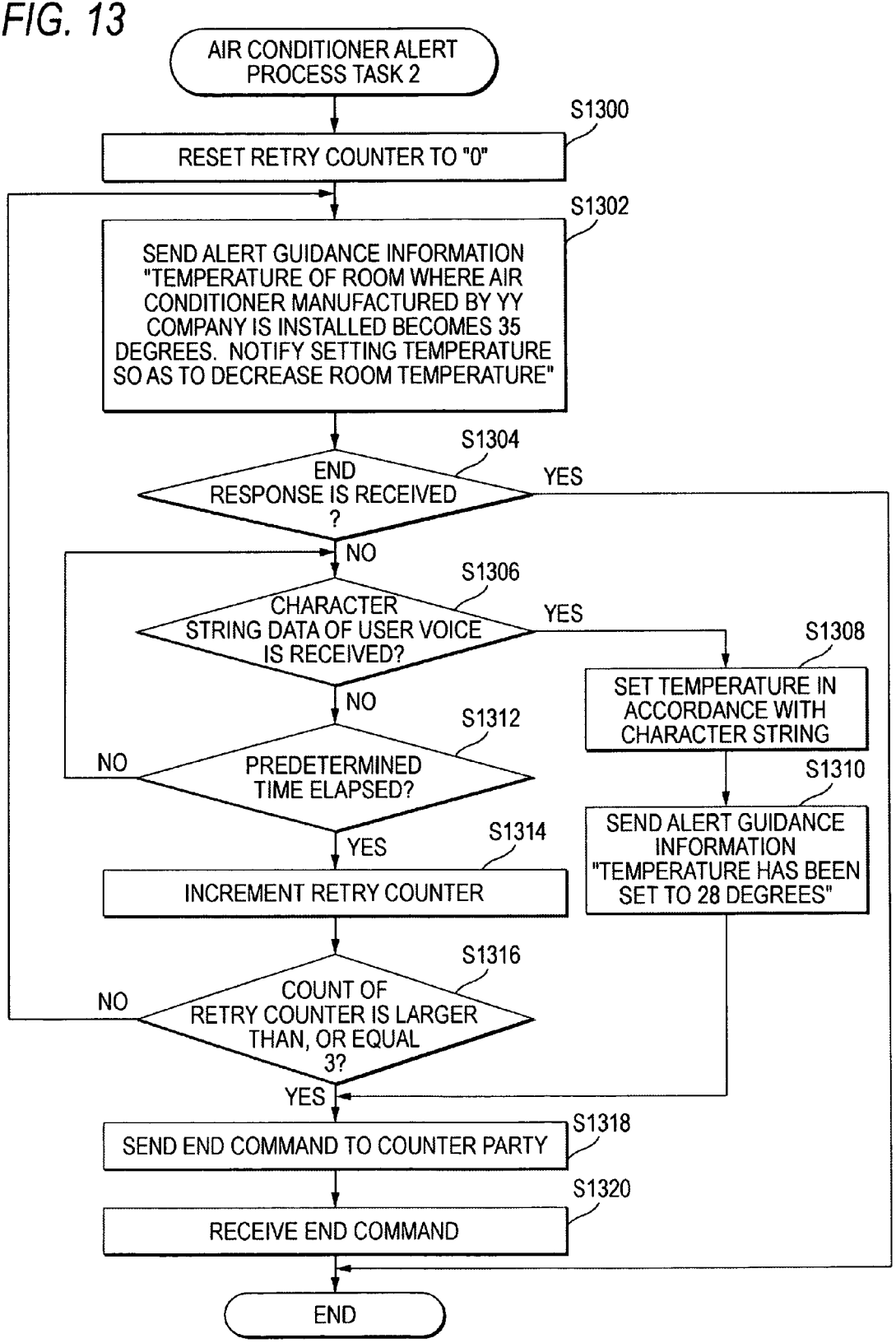
FIG. 13 is a flow chart for explaining an air conditioner alert process task 2 according to the aspect of the present invention.

The air conditioner alert process task 2 relates to an alert process task which is executed upon occurrence of an alert state which is defined as the temperature of the room (environment) where the air conditioner 100 is set reaching a predetermined temperature (e.g., 35 degrees to be explained below) or higher with the air conditioner 100 being in standby mode (the state where air conditioning unit 104 is not activated with main power supply being set ON) (S206: YES; such a state is considered as occurrence of alert state in air conditioner 100). FIG. 13 illustrates a flow chart of the air conditioner alert process task 2.

First, when the air conditioner alert process task 2 is executed in the S216 of the air-conditioning main process operation, the control unit 102 resets the retry counter secured in the predetermined storage area in the RAM to "0" (S1300).

Thereafter, the control unit 102 sends an alert guidance (see FIG. 8) associated with the air conditioner alert process task 2 to the multifunction apparatus 200. In the alert guidance associated with the temperature change, character string data, such as "Temperature in the room where the air conditioner of YY company is set has reached 35 degrees. To lower the temperature, indicate a set temperature." is defined as a guidance character string.

Next, the control unit 102 determines as to whether or not an end response for the process task (command name: END-RESP) is received from the user who has found out an activation of the air conditioner alert process task 2 by the notification by the multifunction apparatus 200 through the transmission in step process S702 (S1304). When the determination result shows that the endresponse is received (S1304: YES), the control unit 102 accomplishes the process operation without executing the subsequent process operations. The end response is sent from the multifunction apparatus 200 when the user once picks up the telephone handset 224 and then returns it (refer to "S2024 and S2026 in alert process operation (FIG. 20)" by multifunction apparatus which will be described later).

On the other hand, when the end response is not received (S1304: NO), the control unit 102 subsequently determines whether or not the input of character string data (refer to "S2014 in alert process operation (FIG. 20)" by multifunction apparatus to be described later), acquired by converting a voice of the user produced toward the telephone handset 224, is received as user voice information (command name: USERVOICE) from the multifunction apparatus 200 (S1306). That is, the control unit 102 determines as to whether or not the user has designated the setting temperature in response to the alert guidance "To lower the temperature, indicate a setting temperature" in the alert guidance in the S1302.

When receiving the user voice information in the S1306 (S1306: YES), the control unit 102 sets the setting temperature to the designated temperature according to the character string data included in the user voice information (S1308). To inform the user of a change in setting temperature, the control unit 102 sends the alert guidance including "Temperature set to 28 degrees" as a guidance character string to the multifunction apparatus200 (S1310)1,and then proceeds to a process step S1318.

The user voice information received in the S1306 is constructed of items shown in FIG. 14.

When determining that the user voice information is not received in the S1306 (S1306: NO), the control unit 102 proceeds to a process step S1312.

Since process operations in S1312 to S1320 are the same as those of the S710 to S718 in the air conditioner alert process task 1, the explanation will be omitted.

(Main Process Operation of Multifunction Apparatus)

Figure 15:
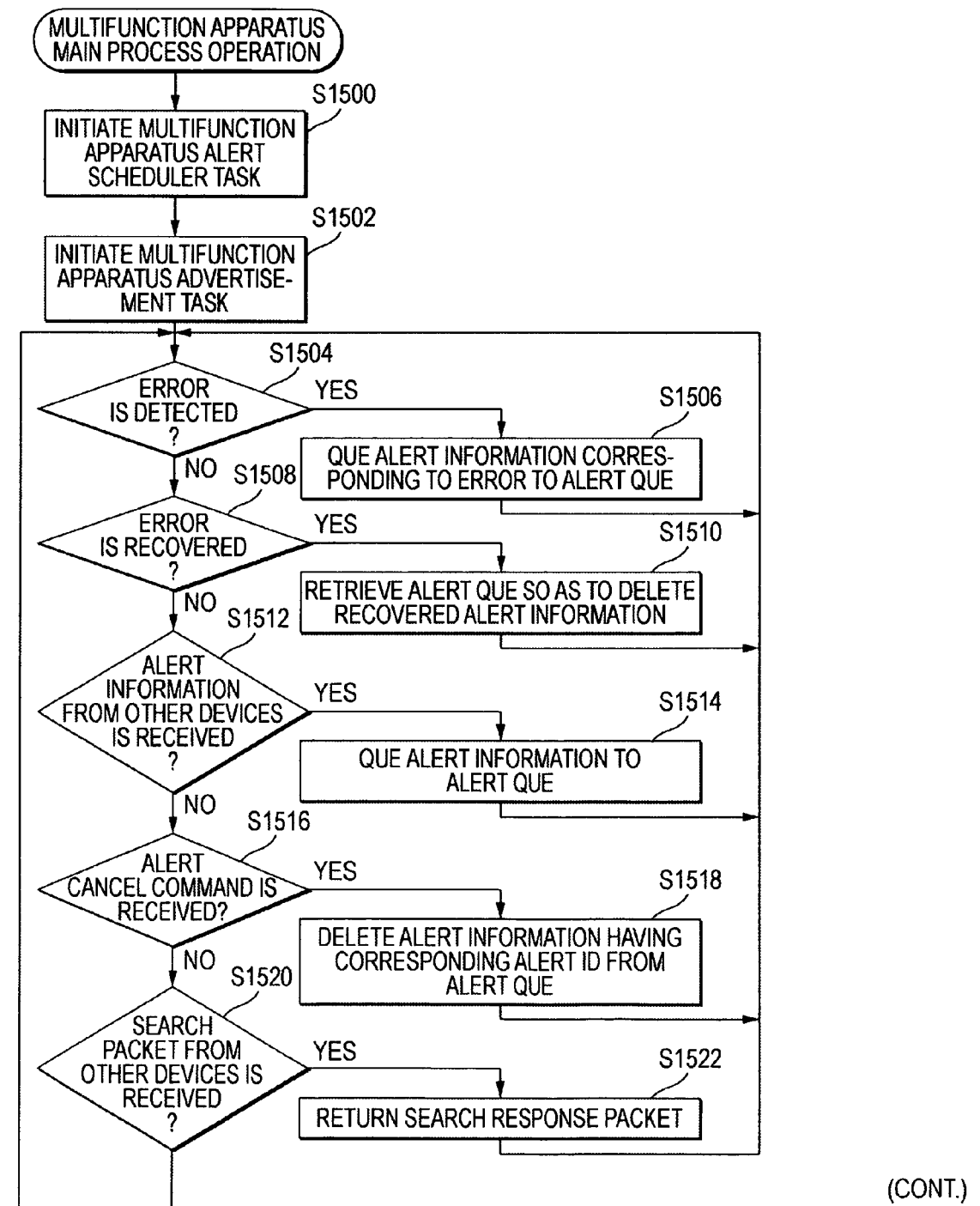
FIG. 15 is a flow chart for explaining a multifunction apparatus main process operation according to the aspect of the present invention.

FIG. 15 illustrates a flow chart of a main process operation which is executed by the multifunction apparatus 200.

First, when the user switches ON the main power supply of the multifunction apparatus 200, the control unit 102 thereof activates a multifunction apparatus advertisement task (S1500), and then activates a multifunction apparatus alert scheduler task (S1502). The process operations of both tasks are executed in parallel to the main process operation of the multifunction apparatus 200. The details of the "multifunction apparatus advertisement task" and the "multifunction apparatus alert scheduler task" will be given later.

Next, the control unit 202 determines as to whether or not an occurrence of an error in the multifunction apparatus 200 is detected by the sensor 222 (S1504). When the occurrence of this error is detected (S1504: YES), the control unit 202 generates alert information (see FIG. 5) corresponding to the detected error, and queues the alert information in an alert queue secured in a predetermined storage area in the storage unit 220 (S1506).

The "IP address" contained in the alert information generated by the control unit 202 in the S1506 is an IP address given to the multifunction apparatus 200, because the error (alert) has occurred in the multifunction apparatus 200. The "alert task" is a task ID defined as the multifunction apparatus alert process task (refer to FIG. 22).

The process operations in the S1504 and S1506 are the same process operations as are executed for the case of an alert state occurred in the air conditioner 100. An error occurring in the multifunction apparatus 200 is considered to be the same as that occurring in the air conditioner 100.

When detecting recovery of an error previously detected and concerning alert information queued to the alert queue (S1508: YES), not an error currently occurring in the multifunction apparatus 200 (S1504: NO), the control unit 202 searches the corresponding alert information from the alert queue and deletes the alert information (S1510). Specifically, even in a case where a depletion of an ink is detected as an error, if the ink is to be replaced with a new ink available to the user at present, the determination in the S1508 is "YES" and S1510 is executed.

Next, the control unit 202 determines as to whether or not alert information sent in the S208 is received (S1512). When the control unit 202 determines in the S1512 that the alert information is received (S1512: YES), the control unit 202 queues the received alert information in the alert queue in the storage unit 220 (S1514). The alert information to be queued in the S1514 has the same contents as the alert information stored in the alert information storage unit of the air conditioner 100 in the S208.

When the information determined as having been received by the control unit 202 is not alert information from another device (S1512: NO), the control unit 202 determines whether or not the information is an alert cancel command sent in the S212 (S1516). When having determined that the alert cancel command has been received (S1516: YES), the control unit 202 deletes the alert information containing the same alert ID as the alert ID of the received alert cancel command from the alert queue (S1518).

When the information determined as having been received by the control unit 202 is not the alert cancel command (S1516: NO), the control unit 202 determines as to whether or not the information is a search packet sent in the S200 (S1520). When having determined that the search packet has been received (S1520: YES), the control unit 202 returns a search response packet to the sender (corresponding to air conditioner 100 in this aspect) according to the IP address contained in the search packet so as to inform the user of the multifunction apparatus 200 being a notifiable apparatus with respect to an event occurred in the air conditioner 100 (S1522).

The control unit 202 returns to S1504 after executing the S1506, S1510, S1514, S1518 and S1522 so as to determine error detection again.

The control unit 202 executes a process operation which does not directly relate to the network system 1, specifically, a process operation relating to an ordinary telephone communication, while executing the process operations mentioned above. That is, the control unit 202 determines as to whether or not a telephone call has come over the telephone line 400 (S1524).

When the control unit 202 determines that a call request has been made in the S1524 (S1524: YES), a ringing tone is generated from the speaker of the multifunction apparatus 200 (S1526), and determines whether or not the user has picked up the telephone handset 224 within a given time in response to the ringing (S1528).

When the user has picked up the telephone handset 224 within the given time and started a telephone communication (S1528: YES), the control unit 202 stores the starting time of the telephone communication as a telephone communication history in a telephone communication history storage area secured in a predetermined area in the storage unit 220 (S1530), and continuously performs a telephone communication process operation (S1532/S1534: NO) until the user sets the telephone handset 224 back to a predetermined place (S1534: YES).

As long as the call request continues (S1536: NO) after generation of the ringing tone has started (S1526), the control unit 202 keeps generating of the ringing tone until the user picks up the telephone handset 224.

Figure 19:
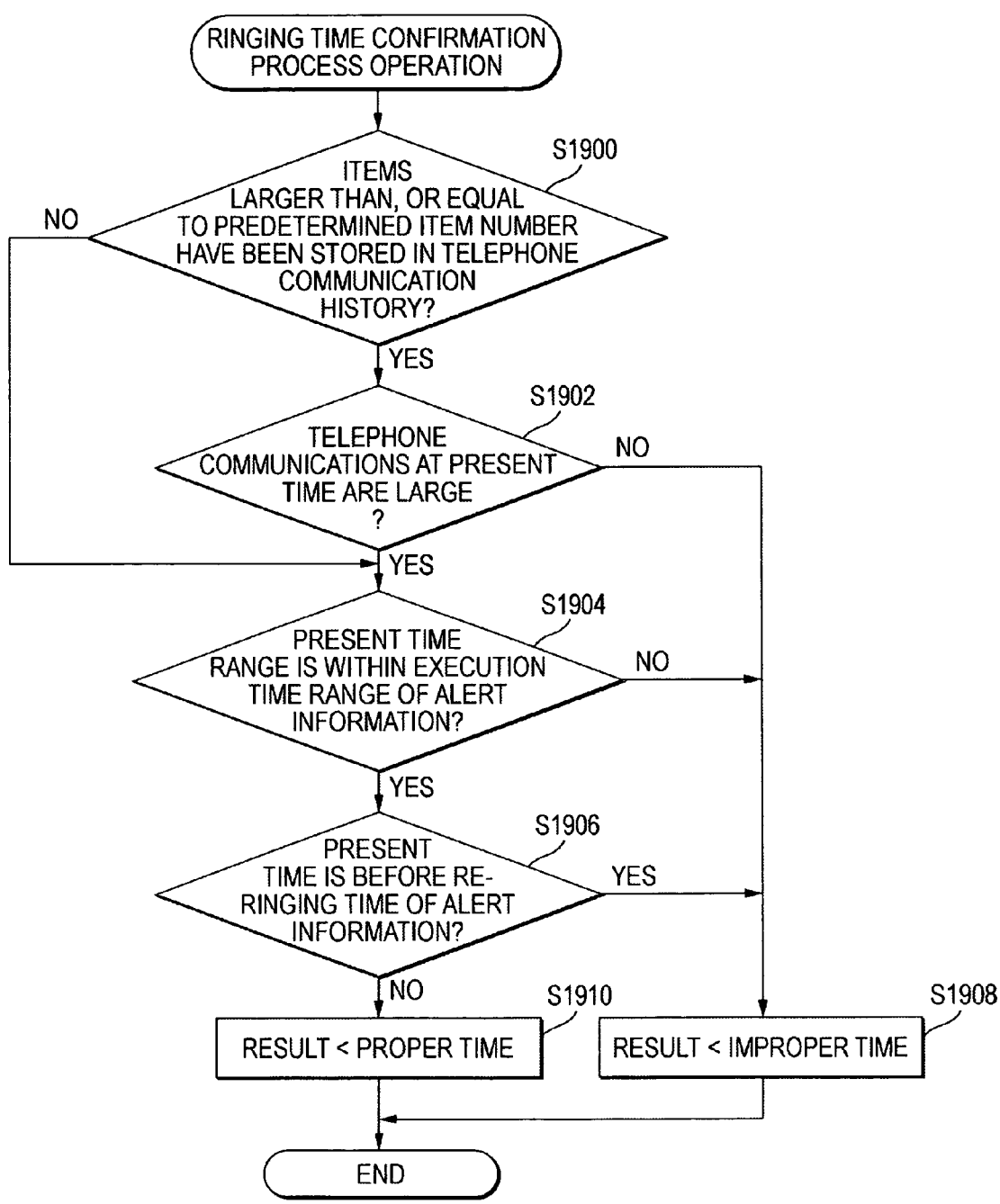
FIG. 19 is a flow chart for explaining a ringing time confirmation process operation according to the aspect of the present invention.

The telephone communication history stored in the S1530 is the basis of the determination in S1902 in a ringing time checking process operation (refer to FIG. 19) to be described later. That is, statistics are taken on a case where the user can cope with a telephone call request within a given time and a case where the user cannot, and the determination in S1902 is to be made based on the result. Although the configuration requires the condition "within a given time" in the determination in the S1528, the determination may be made based on "whether the telephone handset 224 is picked up or not". In this aspect, however, this condition is contained in the determination condition because of a possible case where the user could not pick up the telephone handset 224 originally, i.e., the user could not take the telephone handset 224 but cannot help but pick up the telephone handset 224 due to the ringing tone being repeatedly generated.

The control unit 202 determines as to whether or not the alert guidance start command (refer to S2004 in FIG. 20 and FIG. 21) sent in the alert process operation in the multifunction apparatus alert scheduler task which is activated in the S1502 (refer to FIG. 20 for details) is received (S1538).

When the control unit 202 determines that the alert guidance start command is received (S1538: YES), the control unit 202 initiates the process operation corresponding to the task ID described in the alert information which has the same alert ID as the alert ID included in the alert guidance start command (S1540).

The reception of the alert guidance start command is premised on that as the origin of causing an alert state, an IP address is described in the alert information which is the target in S2004 in the alert process operation to be described later. The alert guidance start command is to be received in the S1538 according to the structure of this aspect (S1538: YES) only when the determination in the S1504 is "YES" and the alert information is queued in the alert queue. The alert task which is initiated in the S1540 in this aspect is the alert process task that is executed by the multifunction apparatus 200 (for example, multifunction apparatus alert process task shown in FIG. 22 defined as alert process task corresponding to ink depletion when error detected in S1504 is ink depletion)

(Multifunction Apparatus Advertisement Task)

This multifunction apparatus advertisement task is assumed on a case where when the control unit 102 of the air conditioner 100 broadcasts a search packet (refer to S200 in FIG. 2), a search response packet cannot be returned due to, for example, the main power supply of the multifunction apparatus 200 being turned OFF (refer to S1522 in FIG. 15). The task is executed so that even in such a case, the control unit 102 can allow an IP address assigned to the multifunction apparatus 200 or a sender indicated in the received advertisement packet (command name: ALERTDEVICE) to be stored as a notifiable multifunction apparatus 200 in the storage unit 114.

First, the control unit 202 of the multifunction apparatus 200 broadcasts an advertisement packet describing an IP address assigned thereto (refer to FIG. 16) (S1700).

After taking a break for a given time (S1702), the control unit 202 returns to the S1700 again to keep broadcasting the advertisement packet.

The broadcasting of the advertisement packet is repeatedly executed every predetermined time in consideration of the possibility that the air conditioner 100 may not receive the advertisement packet in a single broadcast which is done in a predetermined period due to, for example, the main power supply of the air conditioner 100 being turned OFF.

That is, the network system 1 of this aspect takes into account how to provide the functions realizable by this system more surely.

The advertisement packet is received in the S220 which is executed in the air-conditioning main process operation (refer to FIG. 2) which is executed by the control unit 102 of the air conditioner 100, and the IP address assigned to the multifunction apparatus 200 which is described in the advertisement packet is stored as a notifiable multifunction apparatus 100 in the storage unit 114.

(Multifunction Apparatus Alert Scheduler Task)

The multifunction apparatus alert scheduler task is a process operation which is executed to ensure notification in an adequate period (timing) when an event which should be notified to a user of an apparatus constituting the network system 1 occurs in the apparatus.

First, the control unit 202 reads alert information queued in the alert queue in this order piece by piece in the S1506 and S1514 in the composite-appliance main process operation (refer to FIG. 15) (S1800).

Then, the control unit 202 determines as to whether or not the description on an urgency level included in the read alert information is a "high level" (S1802). The urgency level defines the determination criteria for determining as to whether the user should be notified urgently when an alert state (error) occurs in the air conditioner 100 or the multifunction apparatus 200. That is, "high level" is described as an urgency level for an alert state or so having a high urgency level, while a "low level" is described for a low alert state.

When the control unit 202 determines in S1802 that the urgency level of the alert information read in the S1800 is described as high level (S1802: YES), the control unit 202 executes an alert process operation (refer to FIG. 20) to be described later at that point.

When the control unit 202 determines that the urgency level is described as a low level (S1802: NO), the control unit 202 is advanced to S1804 so as to execute the ringing time checking process operation (see FIG. 19). When the time is determined as adequate (see S1910) in the ringing time checking process operation (S1806: YES), the control unit 202 executes an alert process operation (S1808). When the time is determined as inadequate (see S1908) in the ringing time checking process operation (S1806: NO), the control unit 202 returns to S1800 and repeats the above-described process operations.

(Call Time Checking Process Operation)

The ringing time checking process operation is executed in order to judge the process step S1806 in the composite-appliance alert task scheduler task. More specifically, the control unit 202 determines as to whether or not the current time is adequate as the ringing time depending on whether or not the user is making a telephone response at the current time, as the actual result of old telephone responses, with a predetermined probability or higher (S1902), whether or not the current time is included in the execution time range of alert information (S1904), and whether or not the current time is before a re-ringing time set in S2032 in the alert process operation (refer to FIG. 20) to be described later.

First, the control unit 202 determines as to whether or not the telephone communication history stored in the S1530 has a given number of records stored therein (S1900). This determination is based on the fact that a predetermined number or a greater number of populations are needed to acquire the statistics of times (time zone) the user can cope with in the determination of S1902.

When the telephone communication history does not have a given number of records stored therein (S1900: NO), therefore, the control unit 202 is advanced to a process step S1904 without executing a process step S1902. When the condition is fulfilled, however, the control unit 202 executes the process step S1902.

In the S1902, the control unit 202 determines whether or not the current time identified by the RTC 204 of the multifunction apparatus 200 corresponds to an acceptable time (zone) based on the time stored in the storage unit 220 in the S1530.

The determination in the S1902 can be made by checking if the current time is included in any of reference time zones that are set by, for example, giving a predetermined time to before and after each of the times stored in the storage unit 220. As another scheme, the determination can be made by setting a reference time zone based on the earliest time and the latest time in the times stored in the storage unit 220, and determining as to whether or not the current time is included in this time zone. It should also be noted that the determination can also be made by checking the current time matches with any stored time. In the case of making the determination, it is to be noted that the determination "S1902: NO" is more likely to come up if there are few times stored as a population.

When the control unit 202 determines in the S1902 that there are a lot of telephone communications at the current time (S1902: YES), the control unit 202 then checks as to whether or not the current time lies within the execution time range of alert information (S1904). The "execution time range" is a time (zone) which is set regardless of the action of the user, and is set according to, for example, the type of the alert task (execution time range may not be set depending on type of alert task). Referring to the explanation based on the "air conditioner alert process task 1", the time zone where a telephone order for a filter can be made to the Consumables Communication Center.

When the control unit 202 determines in the S1904 that the current time lies in the execution time range (S1904: YES), the control unit 202 then determines as to whether or not the current time is before the re-ringing time for alert information (S1906). The re-ringing time for alert information will be explained in the later description of the alert process.

Then, when the control unit 202 determines in the S1906 that the current time is before the re-ringing time for alert information (S1906: NO), the control unit 202 determines that the current time is adequate as the ringing time (S1910). When the determinations in the S1902 and S1904 are "NO" and the determination in the S1906 is "YES", the control unit 202 determines that the current time is inadequate as the ringing time (S1908).

(Alert Process Operation)

When the control unit 202 determines in the composite-appliance alert task scheduler task that the current time is the adequate ringing time (S1806: YES), the control unit 202 generates a ringing tone from the speaker of the multifunction apparatus 200 (S2000). Then, the control unit 202 determines as to whether or not the user has picked up the telephone handset 224 within a given time in response to the ringing tone (S2002).

When the user has picked up the telephone handset 224 within the given time in response to the ringing operation, the control unit 202 sends an alert guidance start command to an apparatus to which the IP address described in the alert information has been applied that is read out from the alert queue in the S1800 and is the process target (S2004).

The alert guidance start command to be sent in the S2004 is to be received in the S214 (refer to FIG. 2) or the S1538 (refer to FIG. 15).

The alert guidance start command (command name: STARTALERTGUIDANCE) contains items shown in FIG. 21. What is described in the alert ID is the alert ID described in the alert information which is the process target.

In response to the transmission of the alert guidance start command, the control unit 202 receives alert guidance information sent as a result of executing the process step S702 (refer to FIG. 7) or the S2202 in the multifunction apparatus alert process task (refer to FIG. 22) to be described later (S2006). Then, character string data described in the alert guidance information is synthesized by the voice synthesizing unit 212, and is generated from the telephone handset 224 (or the speaker) (S2006).

In S2008, according to the alert guidance generated in the S2006, the control unit 202 determines as to whether or not the user has performed an operation of a key arranged at the operation unit 218, specifically, whether or not the user has pressed the key "#" if the initiated process task is the "air conditioner alert process task 1" or the "multifunction apparatus alert process task" to be described later.

When the control unit 202 detects the key depression, the control unit 202 sends key information containing character string data related to the pressed key to an apparatus as the process target (apparatus to which IP address described in address information is assigned in the S1800; the same is true of S2014 and S2026) (S2010). The key information to be sent in the S2010 is received in the S706 and S2206.

When the information generated in the S2006 does not indicate depression of a key (S2008: NO), the control unit 202 determines as to whether or not the voice utterance of the user via the telephone handset 224 is detected (S2012). Specifically, this determination is made when the initiated process task is the "air conditioner alert process task 2".

When the result of the determination indicates the detection of the voice utterance of the user, the control unit 202 converts the voice identified via the voice synthesizing unit 212 into character string data, which is sent as user voice information (S2014). The user voice information is received in S1306.

When the control unit 202 cannot detect the voice utterance of the user, the control unit 202 determines as to whether or not the alert guidance is received again (S2016). When the result of the determination indicates the reception of the alert guidance (S2016: YES), the character string data described in the alert guidance is synthesized by the voice synthesizing unit 212, and is generated from the telephone handset 224 (or the speaker) (S2018).

When the determination results in the S714, S1316 and S2214 are "NO" and the process steps S702, S1302 and S2202 are executed again, the alert guidance is received again in the S2016.

When the control unit 202 determines that the alert guidance has not been received again (S2016: NO), the control unit 202 is advanced to a process step S2020.

In the S2020, the control unit 202 determines as to whether or not a call command sent in the S708 or S2208 is received (S2020). When the result of the determination shows that the call command is received (S2020: YES), the control unit 202 initiates the telephone communication process task to be described later (S2022).

When the control unit 202 determines that the call command is not received (S2020: NO), the control unit 202 makes a determination on the end command to be sent in the S716, S1318 or S2216, or whether or not the user has placed the telephone handset 224 back to the predetermined position of the multifunction apparatus 200 (S2024). When the determination condition is met, the control unit 202 sends the end response, and deletes the alert information as the process target in the S1800 from the alert queue (S2034), then accomplishes the alert process operation.

When the control unit 202 does not detect the reception of the end command or the on-hook of the telephone handset 224 by the user (S2024: NO), the control unit 202 returns to the S2008 and repeats the above-described process operations (S2008 to S2024).

If the construction is made in such a way that, unlike the exemplified alert process task of this aspect, an alert task which sends alert guidance information multiple times is defined and an alert process task according to the alert task is executed, specifically, if an alert guidance is sent multiple times during execution of the alert process task, the control unit 202 determines "YES" in the determination of the S2016 and then executes the process step S2018.

When the control unit 202 determines that the user has not picked up the telephone handset 224 within a given time (S2002: NO), on the other hand, the control unit 202 stops generating of the ringing tone and then executes a process step S2028.

The control unit 202 increments the ringing counter for alert information in the S2028, and determines as to whether or not the value of the ringing counter exceeds a predetermined re-call number (call MAX) (S2030).

When the result of the determination in S2030 shows that the value of the ringing counter exceeds the ringing MAX (S2030: YES), the control unit 202 deletes the alert information as the process target in the S1800 from the alert queue (S2034), and then accomplishes the alert process operation.

When the value of the ringing counter (initial value being set to "0") is equal to or smaller than the ringing MAX (S2030: NO), the control unit 202 sets the time elapsed by a predetermined time (one hour in FIG. 5) described as a ringing interval in the alert information from the current time identified by the RTC 204 (reference time in ringing time checking process operation (see FIG. 19) may be taken as current time) as the re-ringing time for the alert information (determined time is described as re-ringing time for alert information and is queued in the alert queue) (S2032), and then accomplishes the alert process operation.

According to the network system 1 of this aspect, in such a case that the user does not respond to the generation of the ringing tone even when the alert process operation is executed a predetermined number of times, the alert state as the process target is not notified. To realize the structure, the "ringing counter" is defined as an item in the alert information to store how many times the alert process is performed.

When the user does not respond to the generation of the ringing tone, the alert process operation can be repeated every predetermined time (until the user responds). This structure does not require definition of the ringing counter.

The structure may be modified so that whether or not to require the ringing counter is changed according to the type of an alert task. In this case, it is possible to make the setting condition according to the need for notification to the user.

(Multifunction Apparatus Alert Process Task)

The above-described multifunction apparatus alert process task corresponds to such a process operation which is initiated by executing a process step S1540 of the multifunction apparatus main process operation.

Figure 22:
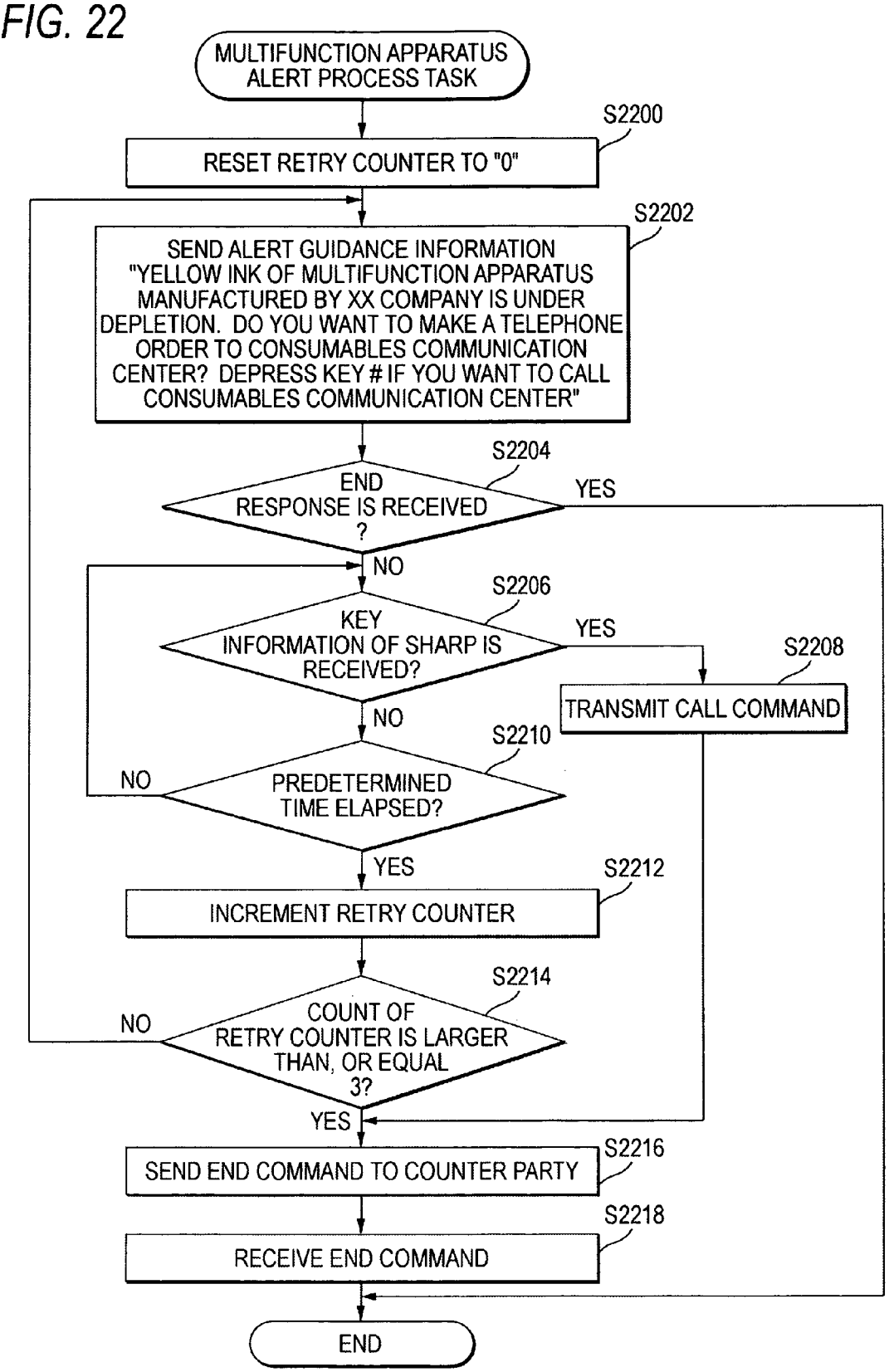
FIG. 22 is a flow chart for explaining a multifunction apparatus alert process task according to the aspect of the present invention.

Concretely speaking, the multifunction apparatus alert process task is executed in accordance with a sequential operation shown in FIG. 22. It should be understood that the alert process task indicated in FIG. 22 is directed to such a process operation that an ink depletion is detected in the printing unit 210 of the composite apparatus 200.

First, when the multifunction apparatus alert process task is executed, the control unit 202 of the multifunction apparatus 200 resets the retry counter secured in the predetermined storage area in the RAM to "0" (S2200).

Then, the control unit 202 sends an alert guidance associated with the multifunction apparatus alert process task to such an apparatus (multifunction apparatus 200) to which the IP address described in the alert information is applied. The alert information should be processed in S1800.

In this case, the alert guidance (command name: ALERT-GUIDNACE) is such a guidance containing the items as represented in FIG. 8. It should also be noted that in the multifunction apparatus alert process task related to the ink deletion, the below-mentioned character string data has been defined as the guidance character string: namely, "Yellow ink of multifunction apparatus manufactured by XX company will be depleted. Is telephone order made to Consumables Communication Center? Depress key "#" when telephone order is made".

It should also be noted that since subsequent process operations are similar to the process operations of the above-described air conditioner alert process operation task 1 (different point is given as information transmission/reception counter party corresponds to multifunction apparatus 200 itself), detailed explanations thereof are omitted.

(Telephone Communication Process Task)

Figure 23:
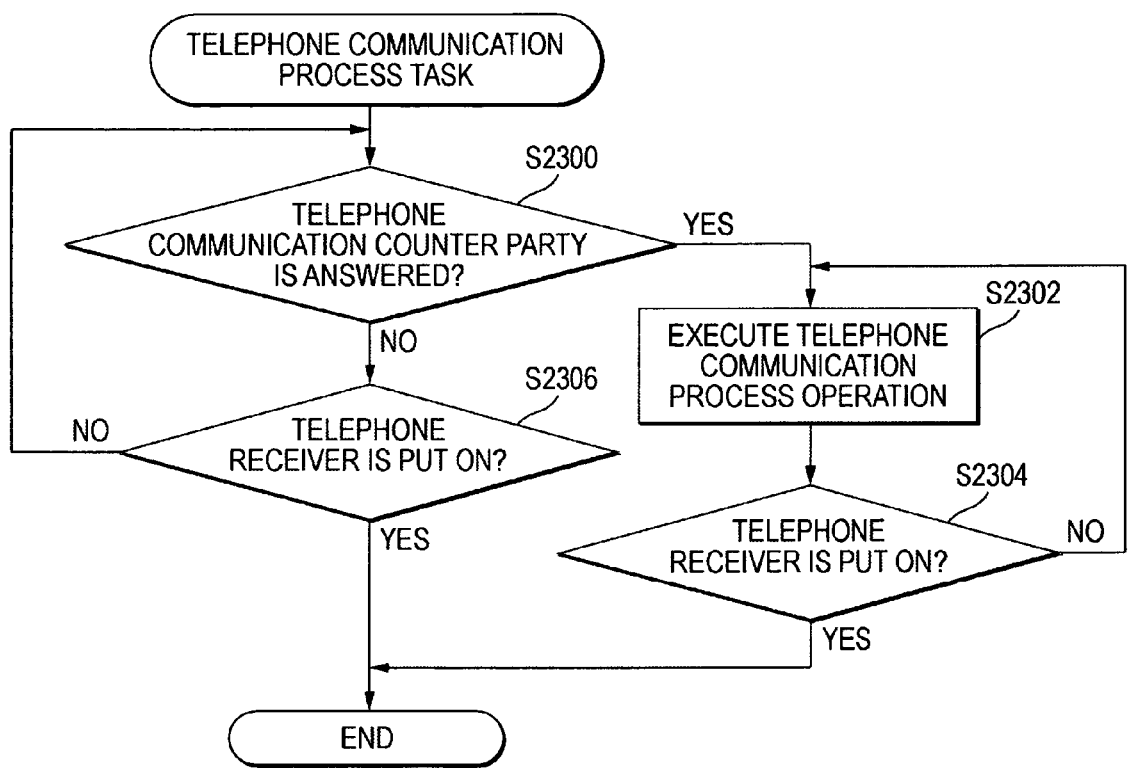
FIG. 23 is a flow chart for explaining a communication process task according to the aspect of the present invention.

As previously explained, the telephone communication process task is commenced by executing the process step S2022 of the alert process operation, concretely speaking, a process operation thereof is indicated in FIG. 23.

In other words, since the telephone communication process task is commenced, the control unit 202 calls a telephone number described in the received call command (S2020: YES), and then waits until a telephone counter party makes a telephone answer (S2300/S2306: NO).

Then, when the telephone counter party makes the telephone answer in response to the telephone call (S2300: YES), the control unit 202 continuously performs the telephone communication process operation (S2302) until the telephone handset 224 is put on the predetermined position of the composite apparatus 200 (S2304: NO).

When the control unit 202 detects that the telephone handset 224 is put on the predetermined position of the multifunction apparatus 200 (S2304, S2306: YES), the control unit 202 accomplishes this telephone communication process task.

What is claimed is:

1. A network system comprising:
    a function execution apparatus that executes a predetermined function; and
    a notifying apparatus connected via a local area network to the function execution apparatus,
    wherein the function execution apparatus comprises:
        a broadcast transmitting unit configured to broadcast a search signal to the local area network to communicate with the notifying apparatus;
        a notifiable information communication unit that receives notifiable information transmitted from the notifying apparatus, the notifiable information indicating that the notifying apparatus is under notifiable state;
        an event detecting unit that detects an event occurred in the function execution apparatus; and
        a specific information transmitting unit that transmits, if the event is detected by the detecting unit, specific information capable of specifying the occurrence of the event directly to the notifying apparatus that transmits the notifiable information, and
    wherein the notifying apparatus comprises:
        a notifying apparatus-sided transmitting unit that transmits notifiable information to the function execution apparatus;
        a notifying apparatus-sided receiving unit that receives specific information transmitted from the function execution apparatus;
        a notifying unit capable of notifying the occurrence of the event in the function execution apparatus; and
        a notification control unit that causes the notifying unit, if the notifying apparatus-sided receiving unit receives the specification information, to notify the occurrence of the event specified by specific information.

2. The network system according to claim 1, wherein the notifiable information communication unit transmits notification permit/not-permit information for determining as to whether or not the notifying apparatus is under notifiable state to the notifying apparatus, and
    the notifying apparatus-sided transmitting unit transmits, upon at least one of a reception of the notification is permit/not-permit information and an elapse of a predetermined time, the notifiable information to the function execution apparatus.

3. The network system according to claim 2, wherein the function execution apparatus further comprises a state transition detecting unit that detects a transition to such a state that the execution apparatus is able to execute its function, and
    the notifiable information communication unit transmits, if the transition to such the state that the function execution apparatus is able to execute its function is detected, the notification permit/not-permit information to the notifying apparatus.

4. The network system according to claim 1, wherein the notifying apparatus is a telephone apparatus.

5. The network system according to claim 1, wherein the notifying unit comprises a telephone handset configured to output alert guidance indicative of the occurrence of the event specified by specific information.

6. The network system according to claim 1, wherein the function execution apparatus sends a call command to the notifying apparatus to which the specific information transmitting unit transmits the specific information.

7. The network system according to claim 6, wherein the notifying apparatus receiving the call command from the function execution apparatus calls a place designated in the call command by a telephone.

8. The network system according to claim 7, wherein the notifying apparatus is configured to determine whether notifying apparatus is allowed to call the place, and wherein the notifying apparatus is configured call the place if the notifying apparatus determines that the notifying apparatus is allowed to call the place.

* * * * *